(12) United States Patent
Arao

(10) Patent No.: US 6,667,990 B1
(45) Date of Patent: Dec. 23, 2003

(54) TRANSMISSION TERMINAL STATION APPARATUS AND NETWORK SYSTEM

(75) Inventor: Hideaki Arao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/472,343

(22) Filed: Dec. 27, 1999

(30) Foreign Application Priority Data

Mar. 17, 1999 (JP) .......................................... 11-072228

(51) Int. Cl.⁷ .................................................. H04J 3/04

(52) U.S. Cl. ...................... 370/465; 370/535; 370/907; 370/517; 714/800

(58) Field of Search ................................ 370/222, 223, 370/274, 248, 249, 465, 907, 522, 535, 517

(56) References Cited

U.S. PATENT DOCUMENTS 6,169,754 B1 * 1/2001 Sugawara et al. .......... 370/535
6,493,847 B1 * 12/2002 Sorgi et al. ................. 714/800

FOREIGN PATENT DOCUMENTS

JP            5-37485         2/1993

* cited by examiner

Primary Examiner—Douglas Olms
Assistant Examiner—Robert W. Wilson
(74) Attorney, Agent, or Firm—Katten Muchin Zavis Rosenman

(57) ABSTRACT

This invention is a transmission terminal station apparatus. The transmission terminal station apparatus is connected to a low-order group terminal device through a low-speed line and connected to a high-order group terminal station device through a high-speed line. The transmission terminal station apparatus includes a detection unit, a first insertion unit, a multiplexing unit, and a second insertion unit. The detection unit, when a frame is received from the low-order group terminal device, detects, as detection information, information related to operation maintenance information to be transmitted from the overhead of the frame to the high-order group terminal station device. The first insertion unit inserts detection information detected by the detection unit into a space area of the frame. The multiplexing unit generates a multi-frame including the frame. The second insertion unit inserts new operation maintenance information into an overhead of the multi-frame generated by the multiplexing unit to transmit the operation maintenance information toward the high-order group terminal station device.

26 Claims, 6 Drawing Sheets

FIG. 3

| #1 | #2 | #3 | ...... | #48 | #1 | #2 | #3 | ...... | #48 | #1 | #2 | #3 | ...... | #48 | |
|---|---|---|---|---|---|---|---|---|---|---|---|---|---|---|---|
| A1 | A1 | A1 | | A1 | A2 | A2 | A2 | | A2 | J0 | C1 | C1 | | A1 | |
| B1 | | | | | E1 | E2 | | | | F1 | | | | | |
| D1 | | | | | D2 | | | | | D3 | | | | | STS-48 SPE (PAYLOAD) |
| H1 | H1 | H1 | | H1 | H2 | H2 | H2 | | H2 | H3 | H3 | H3 | | H3 | |
| B2 | B2 | B2 | | B2 | K1 | | | | | K2 | | | | | |
| D4 | D4 | | | | D5 | | | | | D6 | | | | | |
| D7 | | | | | D8 | | | | | D9 | | | | | |
| D10 | | | | | D11 | | | | | D12 | | | | | |
| Z1 | | TC | | | Z2 | | Z2 | | | E2 | E2 | | | | |

*UNUSED BYTE IS ALL"0".

FIG. 4

| MSB | 2 | 3 | 4 | TC#3 BYTE 5 | 6 | 7 | LSB | THE NUMBER OF DETECTED ERRORS |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 1 | 1 |
| 0 | 0 | 0 | 0 | 0 | 0 | 1 | 0 | 2 |
| 0 | 0 | 0 | 0 | 0 | 0 | 1 | 1 | 3 |
| 0 | 0 | 0 | 0 | 0 | 1 | 0 | 0 | 4 |
| 0 | 0 | 0 | 0 | 0 | 1 | 0 | 1 | 5 |
| 0 | 0 | 0 | 0 | 0 | 1 | 1 | 0 | 6 |
| 0 | 0 | 0 | 0 | 0 | 1 | 1 | 1 | 7 |
| ... | ... | ... | ... | ... | ... | ... | ... | ... |
| 1 | 1 | 1 | 1 | 1 | 1 | 0 | 0 | 252 |
| 1 | 1 | 1 | 1 | 1 | 1 | 0 | 1 | 253 |
| 1 | 1 | 1 | 1 | 1 | 1 | 1 | 0 | 254 |
| 1 | 1 | 1 | 1 | 1 | 1 | 1 | 1 | 255 OR MORE |

TRANSMISSION TERMINAL STATION APPARATUS AND NETWORK SYSTEM

BACKGROUND OF THE INVENTION

1. Field of the Invention

The present invention relates to a transmission terminal station apparatus for transmitting data received from a low-order group terminal device to a high-order group terminal station device, a transmission terminal station apparatus for transmitting data received from a high-order group terminal station device to a low-order group terminal device, and a network system including these transmission terminal station apparatuses.

2. Prior Art

With an advance in information systems in recent years, line capacities in a communication network increase. In the field of optical communications, optical fibers which are physical resources of optical lines tend to be short. In contrast to this, the shortage of optical fiber are compensated for by replacing a plurality of low-speed lines into high-speed lines by using a high-order group terminal-station device (called "overlay").

FIGS. 5A and 5B are diagrams for explaining the overlay of an optical communication network. As shown in FIG. 5, the following optical communication network is assumed. That is, the optical communication network is constituted by a plurality of low-order group terminal devices (indicated by blocks in FIG. 5A), and the low-order group terminal devices are connected to each other through low-speed lines (OC-12 or OC-48).

A site A in FIG. 5A has low-order group terminal devices T1 to T3, and a site B has low-order group terminal devices T4 to T6. The low-order group terminal devices T1 to T3 are connected to the low-order group terminal devices T4 to T6 through low-speed lines (e.g., OC-48) L1 to L3. The low-order group terminal device T1 and the low-order group terminal device T4 are transparent to each other, the low-order group terminal device T2 and the low-order group terminal device T5 are transparent to each other, and the low-order group terminal device T3 and the low-order group terminal device T6 are transparent to each other. Note that OC-12 and OC-48 represent optical carrier levels (optical speed standards) defined by SONET (Synchronous Optical Network) serving as one of SDHs (Synchronous Digital Hierarchies).

In this case, as shown in FIG. 5B, high-order group terminal station devices K1 and K2 are arranged in the sites A and B. Each of the high-order group terminal station devices K1 and K2 accommodates a low-order group terminal device in the site to which the corresponding high-order group terminal station device belongs. The high-order group terminal station device K1 and the high-order group terminal station device K2 are connected to each other through a high-speed line (e.g., OC-192) L4.

Each of the high-order group terminal station devices K1 and K2 makes OC-48×4 lines multiplexed to OC-192 transparent in accordance with the transparent relationships of the low-order group terminal devices T1 to T6. In this manner, the low-speed lines L1 to L3 of OC-48 are replaced with the high-speed line L4 of OC-192 to compensate for the shortage of optical fiber.

At this time, the high-order group terminal station devices K1 and K2 are pseudo intermediate repeater device with reference to the low-order group terminal devices T1 to T6.

That is, the low-order group terminal devices T1 to T6 are arranged such that the low-order group terminal devices T1 to T6 can transmit data to the low-order group terminal devices which are transparent to each other in FIG. 5A without regarding the presence of the high-order group terminal station devices K1 and K2 (low-order group terminal devices T1 to T6 can perform transparent transmission).

According to the optical communication network shown in FIG. 5B, for example, when data is transmitted from the low-order group terminal device T1 of the site A to the low-order group terminal device T4 of the site B, the low-order group terminal device T1 transmits data to the high-order group terminal station device K1.

At this time, the low-order group terminal device T1 regards only that the data is transmitted to the low-order group terminal device T4. the high-order group terminal station device K1 multiplexes data received from the low-order group terminal devices T1 to T3 to transmit the multiplexed data to the high-order group terminal station device K2.

The high-order group terminal station device K2 separates the data received from the high-order group terminal station device K1, and transmits, of the separated data, data to be transmitted to the low-order group terminal device T4 to the low-order group terminal device T4. In this manner, the low-order group terminal device T4 receives the data transmitted from the low-order group terminal device T1. The low-order group terminal device T4 regards only that the data is received from the low-order group terminal device T1.

Even if a high-order group terminal station device is inserted between low-order group terminal devices by overlay as described above, it is demanded that the same transmission/reception as that performed when low-order group terminal devices are directly connected through a low-speed line is should be performed between transparent low-order group terminal devices (e.g., the low-order group terminal device T1 and the low-order group terminal device T4, the low-order group terminal device T2 and the low-order group terminal device T5, and the low-order group terminal device T3 and the low-order group terminal device T6 which are shown in FIG. 5A).

With respect to the above demand, in a conventional optical communication network, the following problems are posed. FIG. 6 is a diagram showing problems in a conventional optical communication network. FIG. 6 shows the low-order group terminal devices T1 and T4 and the high-order group terminal station devices K1 and K2 which are shown in FIG. 5B. In the optical communication network, when data is transmitted between transmission terminal station apparatuses (between low-order group terminal devices or between a low-order group terminal device and a high-order group terminal station device), the data is transmitted while the data is stored in a SONET frame (SDH frame).

The SONET frame (SDH frame) has a payload for storing user data (transmission information) and an overhead in which operation maintenance information of a network is stored. The overhead is constituted by a section overhead (SOH), a line overhead (LOH), or the like.

When the low-order group terminal device or the high-order group terminal station device receives a SONET frame, the corresponding group terminal station terminates the SONET frame, generates a new SONET frame depending on an output port of data stored in the SONET frame, and stores data to be transmitted to the payload of each SONET frame to transmit the data to the corresponding output port. In this process, the contents of the overhead of the new SONET frame are new contents to be inserted by the low-order group terminal device or the high-order group terminal station device.

A byte (called a B2 byte) used for monitoring a code error between transmission terminal station apparatuses is stored in the LOH of the overhead. The B2 byte is inserted into the LOH of a SONET frame in a transmission terminal station apparatus on the transmission side, detected by a transmission terminal station apparatus (transmission terminal station apparatus on the reception side) which terminates the SONET frame, and used for monitoring a code error (calculating the number of parity errors).

A monitor result (the number of parity errors) obtained by monitoring a code error is transmitted to the transmission terminal station apparatus on the transmission side (L-FEBE). The transmission terminal station apparatus on the transmission side switches a line used in data transmission to another line when the number of parity errors exceeds a threshold value. In this manner, the transmission quality of data can be maintained.

In FIG. 6, data is transmitted from the low-order group terminal device T1 to the low-order group terminal device T4, a SONET frame in which the data is stored is transmitted from the low-order group terminal device T1 to the high-order group terminal station device K1. At this time, a predetermined B2 byte is inserted into the LOH of the SONET frame.

When the high-order group terminal station device K1 receives the SONET frame from the low-order group terminal device T1, the high-order group terminal station device K1 terminates the SONET frame, and the high-order group terminal station device K1 detects the B2 byte from the terminated SONET frame. The high-order group terminal station device K1 calculates the number of parity errors by using the detected B2 byte, and notifies the low-order group terminal device T1 of the result. On the other hand, the high-order group terminal station device K1 generates a new SONET frame in which the data received from the low-order group terminal device T1, inserts a new B2 byte into the LOH of the new SONET frame. Thereafter, the high-order group terminal station device K1 transmits the SONET frame to the high-order group terminal station device K2.

Thereafter, when the high-order group terminal station device K2 receives the SONET frame from the high-order group terminal station device K1, the high-order group terminal station device K2 performs the same operation as that performed in the high-order group terminal station device K1, and the B2 byte newly inserted in the high-order group terminal station device K2 is received by the low-order group terminal device T4.

At this time, since the low-order group terminal device T4 does not regard the presence of the high-order group terminal station devices K1 and K2, the low-order group terminal device T4 handles the B2 byte (B2 byte inserted by the high-order group terminal station device K2) included in the received SONET frame, and the number of parity errors transmitted from the low-order group terminal device T4 to the low-order group terminal device T1 is received by the high-order group terminal station device K2.

Therefore, the high-order group terminal station device K2 does not switch lines when the number of parity errors received from the low-order group terminal device T4 is within an allowable range. For this reason, although the number of parity errors of the B2 byte between the low-order group terminal device T1 and the low-order group terminal device T4 is out of the allowable range, when the number of parity errors of the B2 byte between the high-order group terminal station device K2 and the low-order group terminal device T4 is within the allowable range, the high-order group terminal station device K2 does not switch lines. In this manner, data may not be properly transmitted between the low-order group terminal device T1 and the low-order group terminal device T4.

As described above, when the high-order group terminal station device is inserted between the low-order group terminal devices (overlay is performed), a B2 byte cannot be transmitted in a transparent mode between the low-order group terminal devices, and a code error cannot be properly monitored by the low-order group terminal device on the reception side. As a result, switching of lines may not be properly performed.

More specifically, when overlay is performed, by inserting a high-order group terminal station device, operation maintenance information stored in an overhead of a frame transmitted from a low-order group terminal device on the transmission side is not received by a low-order group terminal device on the reception side. Therefore, there is a problem that operation maintenance of a network using the operation maintenance information is not performed.

SUMMARY OF THE INVENTION

The present invention has been made in consideration of the above problem, and has as its object to provide a transmission terminal station apparatus and a network system in which information related to operation maintenance information stored in a frame received from a low-order group terminal device can be transmitted to a high-order group terminal station device, and a network system.

For example, it is an object of the present invention to provide a transmission terminal station apparatus and a network system in which a low-order group terminal device on a reception side can monitor a code error between the low-order group terminal device on the reception side and a low-order group terminal device on a transmission side even if a high-order group terminal station device is inserted between low-order group terminal devices.

The first aspect of the present invention is a transmission terminal station apparatus in which a low-order group terminal device is connected through a low-speed line and a high-order group terminal station device is connected through a low-speed line. The transmission terminal station apparatus includes: (1) a detection unit which, when a frame including a payload in which data to be transmitted is stored and an overhead in which operation maintenance information of a network is stored is received from the low-order group terminal device, detects, as detection information, information related to the operation maintenance information to be transmitted from the overhead of the frame to the high-order group terminal station device; (2) a first insertion unit for inserting the detection information detected by the detection unit into a space area of the frame; (3) a multiplexing unit for generating a multi-frame including the frame; (4) and a second insertion unit for inserting new operation maintenance information into an overhead of the multi-frame generated by the multiplexing unit to transmit the operation maintenance information toward the high-order group terminal station device.

According to the first aspect, information related to operation maintenance information which is not transmitted to a high-order group terminal station device in the prior art can be transmitted can be transmitted to a high-order group terminal station device.

The first aspect can also be applied to not only an optical communication network, but also a network which transmits data by using only an electric signal. The frames include not only an SDH frame and a SONET frame, but also, a packet, a frame relay frame, an ATM cell, and the like. The information related to the operation maintenance information and serving as detection information includes operation maintenance information itself and information obtained by processing the operation maintenance information.

The second aspect of the present invention is a transmission terminal station apparatus in which a low-order group terminal device is connected through a low-speed line, and a high-order group terminal station device is connected through a high-speed line. The transmission terminal station apparatus includes: (1) a first extraction unit which, when a multi-frame obtained by multiplexing a plurality of frames each having a payload in which data to be transmitted is stored and an overhead in which operation maintenance information of a network is stored is received from the high-order group terminal station device, extracts the operation maintenance information stored in the overhead of the multi-frame; (2) a second extraction unit for extracting detection information serving as information related to the operation maintenance information stored in the overhead of each frame when each frame included in the multi-frame is received by the high-order group terminal station device from each frame included in the multi-frame; (3) a separation unit for separating the multi-frame into a plurality of frames; and (4) a setting unit for inserting new operation maintenance information generated by using information related to the operation maintenance information extracted by the first extraction unit and the detection information extracted by the second extraction unit into the overhead of each frame separated by the separation unit to transmit the operation maintenance information to the low-order group terminal device.

The first aspect may further include: a first extraction unit which, when a multi-frame obtained by multiplexing a plurality of frames is received from the high-order group terminal station device, extracts operation maintenance information stored in an overhead of the multi-frame; a second extraction unit for extracting detection information from each frame included in the multi-frame; a separation unit for separating the multi-frame into a plurality of frames; and a setting unit for inserting new operation maintenance information generated by using information related to the operation maintenance information extracted by the first extraction unit and the detection information extracted by the second extraction unit into the overhead of each frame separated by the separation unit to transmit the operation maintenance information to the low-order group terminal device.

In this manner, the operation maintenance information and the detection information of the multi-frame received from the high-order group terminal station device are reflected on the contents of the operation maintenance information transmitted to the low-order group terminal device, and the low-order group terminal device can perform operation maintenance of a network between a low-order group terminal device in which operation maintenance information corresponding to the detection information and the low-order group terminal device.

In the first aspect, the operation maintenance information is code error monitoring information, and the detection unit may detect information related to the code error monitoring information stored in the overhead of a frame received from the low-order group terminal device as the detection information.

In the first aspect, the frame is an SDH frame or a SONET frame, the operation maintenance information is a B2 byte, and the detection unit may detect, as the detection information, the number of errors calculated by using the B2 byte stored in the overhead of the frame received from the low-order group terminal device.

As a matter of course, the operation maintenance information and the detection information in the present invention include, e.g., in addition to code error monitoring information (B2 byte), other operation maintenance information (other bytes) defined with reference to an SDH or SONET frame.

In the second aspect, the operation maintenance information is code error monitoring information, the detection information is information related to code error monitoring information stored in the overhead of each frame when the high-order group terminal station device receives each frame included in the multi-frame, and the setting unit may insert new code error monitoring information generated by using information related to the code error monitoring information extracted by the first extraction unit and the detection information extracted by the second extraction unit into the overhead of each frame separated by the separation unit.

In the second aspect, the frame is an SDH frame or a SONET frame, the operation maintenance information is a B2 byte, and the setting unit may insert a B2 byte having a value obtained by reflecting the number of errors of a B2 byte extracted by the first extraction unit and the number of errors of a B2 byte extracted as detection information by the second extraction unit on an initial value of a B2 byte to be inserted into the overhead of each of the frames separated by the separation unit into the overhead of the corresponding frame as new B2 byte.

In the first aspect, the first insertion unit may insert the detection information into a space area of the overhead of the frame.

The third aspect of the present invention is a network system including a first high-order group terminal station device to which a first low-order group terminal device is connected through a low-speed line, and a second high-order group terminal station device to which the first high-order group terminal station device is connected through a high-speed line and to which a second low-order group terminal device is connected through a low-speed line. The first high-order group terminal station device has: a detection unit which, when a frame including a payload in which data to be transmitted is stored and an overhead in which operation maintenance information of a network is stored is received from the first low-order group terminal device, detects, as detection information, information related to the operation maintenance information to be transmitted from the overhead of the frame to the second high-order group terminal station device; a first insertion unit for inserting the detection information detected by the detection unit into a space area of the frame; a multiplexing unit for generating a multi-frame including the frame; and a second insertion unit for inserting new operation maintenance information into an overhead of the multi-frame generated by the multiplexing unit to transmit the operation maintenance information toward the second high-order group terminal station device. The second high-order group terminal station device has: a first extraction unit which, when the multi-frame is received from the first high-order group terminal station device, extracts the operation maintenance information stored in the overhead of the multi-frame; a second extraction unit for extracting the detection information from each frame included in the multi-frame; a separation unit for separating the frames included in the multi-frame; and a setting unit for inserting new operation maintenance information generated by using information related to the operation maintenance information extracted by the first extraction unit and the detection information extracted by the second extraction unit into the overhead of each frame separated by the separation unit to transmit the operation maintenance information to the second low-order group terminal device the separation unit.

According to the transmission terminal station apparatus and the network system of the present invention, information related to operation maintenance information stored in a frame received from a low-order group terminal device can be transmitted to a high-order group terminal station device.

In addition, according to the transmission terminal station apparatus and the network system of the present invention, even if a high-order group terminal station device is inserted between low-order group terminal devices, code error monitoring information inserted by a low-order group terminal device on a transmission side can be received by a low-order group terminal device on a reception side. For this reason, the low-order group terminal device on the reception side can monitor a code error between the low-order group terminal device on the reception side and the low-order group terminal device on the transmission side.

BRIEF DESCRIPTION OF THE DRAWINGS

FIG. 3 is a chart for explaining the format of an STS-48 frame using a TC byte.

FIG. 4 is a chart showing a table of a TC byte.

DETAILED DESCRIPTION OF THE PREFERRED EMBODIMENT

An embodiment of the present invention will be described below with reference to the accompanying drawings.

Principle of Embodiment

Figure 1:
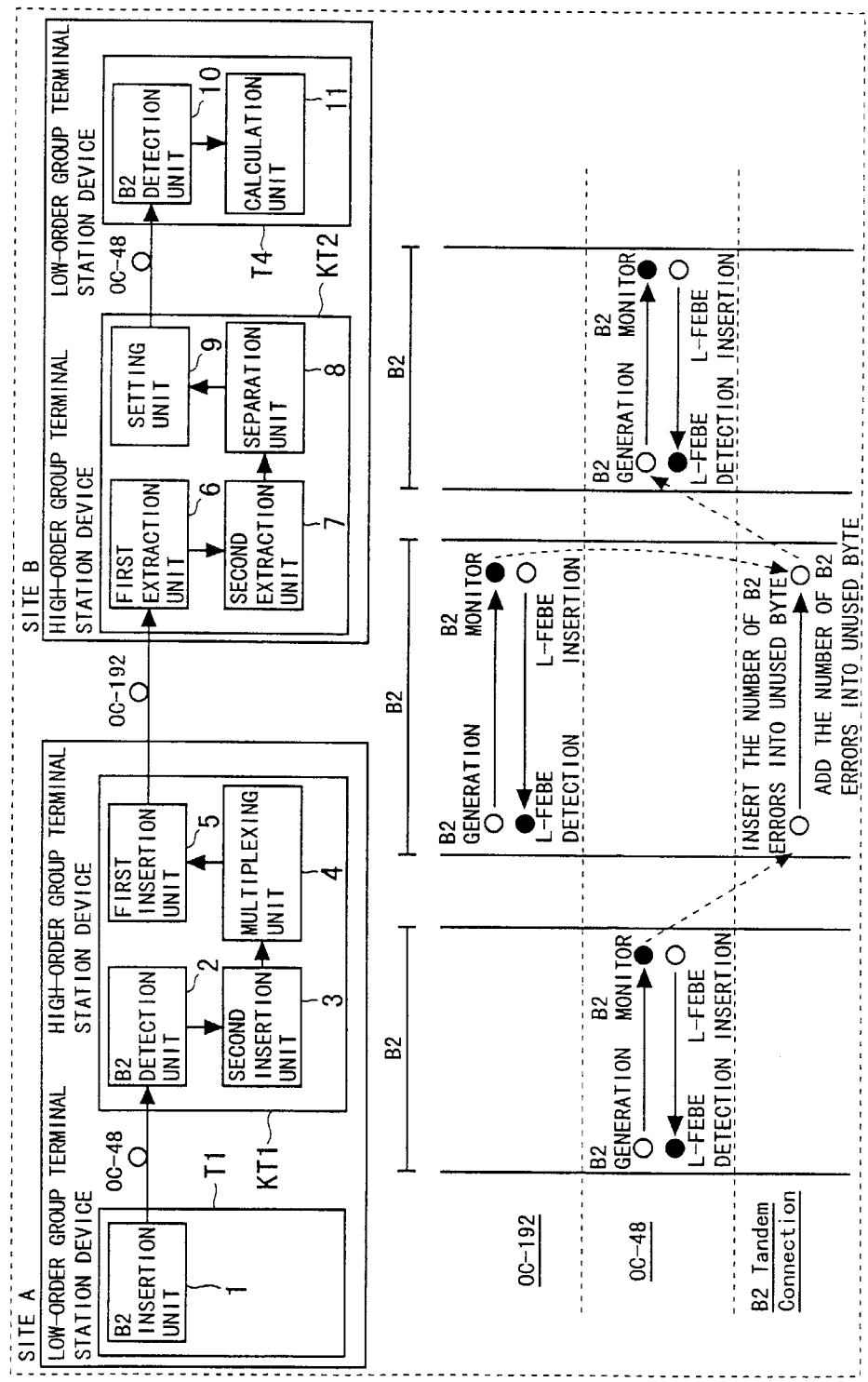
FIG. 1 is a principle diagram of an embodiment of the present invention.

First, the principle of an embodiment of the present invention will be described. FIG. 1 is a principle diagram of the embodiment. FIG. 1 shows an optical communication network (corresponding to a network system according to the present invention) constituted by a site A and a site B.

The site A has a low-order group terminal device T1 (corresponding to a first low-order group terminal device) and a high-order group terminal station device KT1 (corresponding to a transmission terminal station apparatus and a first high-order group terminal station device according to the present invention). The low-order group terminal device T1 and the high-order group terminal station device KT1 are connected to each other through a low-speed line of OC-48 defined by SONET.

On the other hand, the site B has a high-order group terminal station device KT2 (corresponding to a transmission terminal station apparatus and a second high-order group terminal station device according to the present invention) and a low-order group terminal device T4 (corresponding to a second low-order group terminal device). The high-order group terminal station device KT2 and the low-order group terminal device T4 are connected through a low-speed line of OC-48.

The site A and the site B are connected such that the high-order group terminal station device KT1 and the high-order group terminal station device KT2 are connected through a high-speed line of OC-192 defined by SONET. The high-speed line of OC-192 accommodates four low-speed lines of OC-48.

When data is transmitted from the low-order group terminal device T1 of the site A to the low-order group terminal device T4 of the site B, the low-order group terminal device T1 generates a SONET frame (STS-48 frame) having a payload in which data to be transmitted is stored.

At this time, a B2 insertion unit 1 of the low-order group terminal device T1 inserts a B2 byte of a predetermined value into a line overhead (LOH) of the overhead of the STS-48 frame. The B2 byte is a byte for monitoring a code error. The STS-48 frame into which the B2 byte is inserted is transmitted to the high-order group terminal station device KT1.

When the high-order group terminal station device KT1 receives the STS-48 frame from the low-order group terminal device T1, the high-order group terminal station device KT1 detects a B2 byte from the STS-48 frame. The detection unit 2 calculates the number of B2 parity errors (the number of B2 byte errors) by using the B2 byte, and detects the number of B2 parity errors as detection information.

Subsequently, the first insertion unit 3 inserts the detection information (the number of B2 parity errors: corresponding to code error monitoring information) into a space area of the overhead of the STS-48 frame. A multiplexing unit 4 generates a SONET frame (STS-192 frame) as a multi-frame including the STS-48 frame. Thereafter, a second insertion unit 5 newly inserts a B2 byte of a predetermined value into an LOH of the STS-192 frame.

Thereafter, the STS-192 frame is transmitted to the high-order group terminal station device. By processing in the high-order group terminal station device KT1, the number of B2 parity errors serving as detection output is transmitted to the high-order group terminal station device KT2 through a connection different from a conventional B2 byte. The connection for transmitting the detection information is called a "B2 tandem connection (B2TC)" by the present inventor.

When the high-order group terminal station device KT2 receives the STS-192 frame transmitted from the high-order group terminal station device KT1, a first extraction unit 6 extracts detection information (the number of B2 parity errors) from the STS-192 frame. Subsequently, a second extraction unit 7 extracts a B2 byte stored in the LOH of the STS-192 frame. Thereafter, the number of B2 parity errors is calculated by using the B2 byte.

Subsequently, a separation unit 8 separates the STS-192 frame. In this manner, an STS-48 frame transmitted from the low-order group terminal device T1 can be obtained. Thereafter, a setting unit 9 inserts a B2 byte having a value obtained by reflecting the number of B2 parity errors extracted by the first extraction unit 6 and the number of B2 parity errors of a B2 byte extracted by the second extraction unit 7 on an initial value of a B2 byte to be originally inserted in the high-order group terminal station device KT2 into the LOH of the STS-48 frame as a B2 byte. Thereafter, the STS-48 frame is transmitted to the low-order group terminal device T4.

When the low-order group terminal device T4 receives the STS-48 frame from the high-order group terminal station device KT2, a B2 detection unit 10 detects a B2 byte from the STS-48 frame. Subsequently, a calculation unit 11 performs calculation related to code error monitoring by using the B2 byte detected by the setting unit 9. More specifically, the number of B2 parity errors is calculated by using the B2 byte.

In this manner, the low-order group terminal device T4 can calculates the number of B2 parity errors between the low-order group terminal device T1 and the low-order group terminal device T4. Therefore, the low-order group terminal device T4 can perform processing related to code error monitoring between the low-order group terminal device T1 and the low-order group terminal device T4 by using the number of B2 parity errors obtained by the B2 detection unit 10 even if the high-order group terminal station devices KT1 and KT2 are inserted between the low-order group terminal device T4 and the low-order group terminal device T1.

Embodiment of the Invention

A transmission terminal station apparatus and a network system according to the embodiment of the present invention will be described below.

<Configuration of High-order Group Terminal Station Device>

Figure 2:
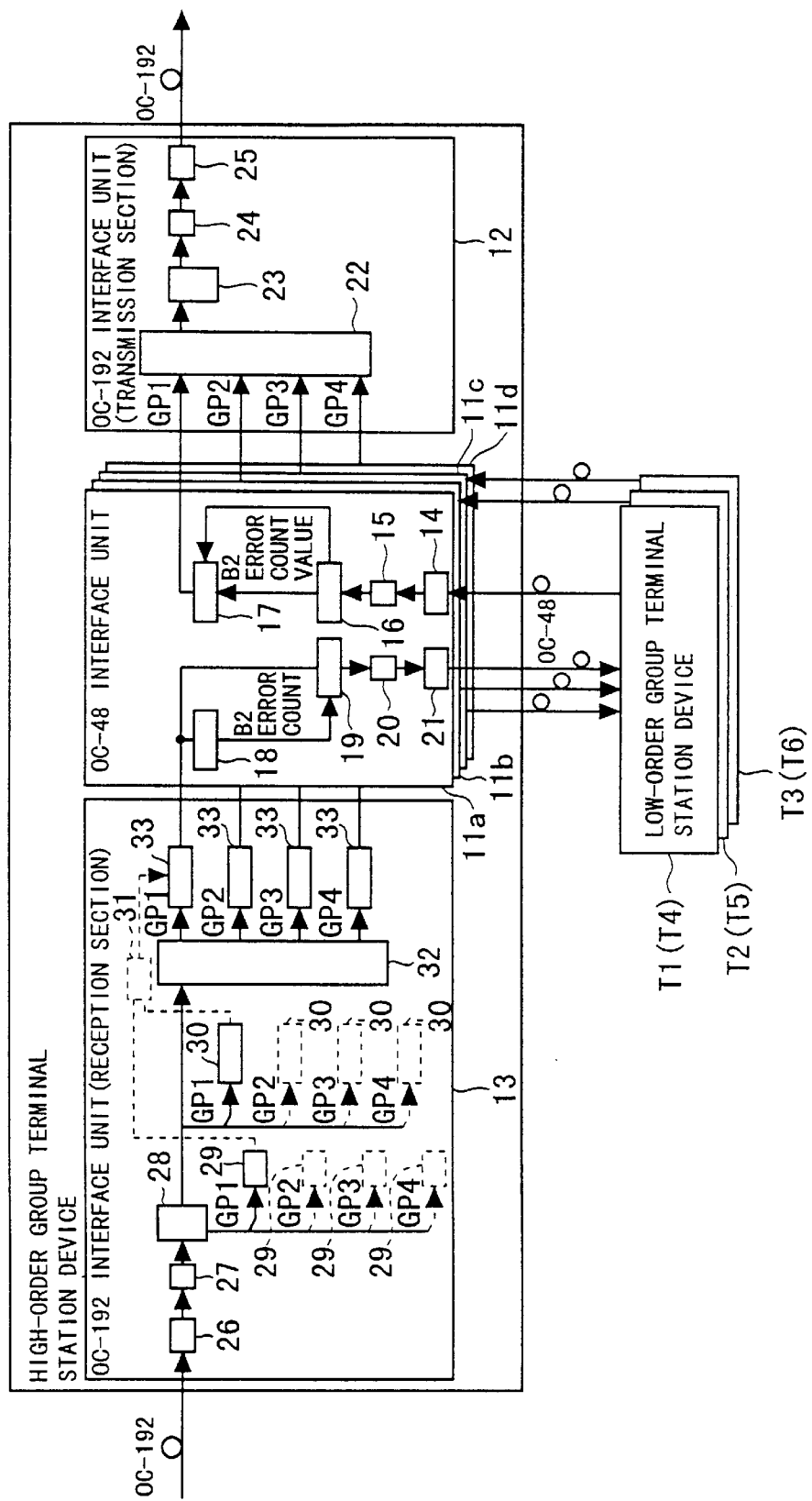
FIG. 2 is a diagram of the configuration of a transmission terminal station apparatus (high-order group terminal station device) according to an embodiment of the present invention.

First, the detailed configurations of the high-order group terminal station devices KT1 and KT2 corresponding to a transmission terminal station apparatus will be described below. FIG. 2 is a diagram of the configuration of each of the high-order group terminal station devices KT1 and KT2 shown in FIG. 1. The configuration of the high-order group terminal station device KT1 is the same as that of the high-order group terminal station device KT2. In this case, the high-order group terminal station device KT1 will be described as an example.

The high-order group terminal station device KT1 comprises OC-48 interface units 11a to 11d arranged for four low-speed lines (group 1 (GP1) to (GP4)) of OC-48 which can be accommodated in the high-order group terminal station device KT1, an OC-192 interface unit 12 on a transmission side, and an OC-192 interface unit 13 on a reception side.

The configurations of the OC-48 interface units 11a to 11d have the same configurations. For this reason, in this case, the OC-48 interface unit 11a will be described as an example. The OC-48 interface unit 11a is arranged depending on the low-speed line (GP1) of OC-48 for connecting the high-order group terminal station device KT1 and the low-order group terminal device T1 to each other. The OC-48 interface unit 11a is roughly constituted by a reception-side portion and a transmission-side portion.

The reception-side portion has a light/electricity conversion unit (OR) 14, a serial/parallel conversion unit (S/P) 15, a B2 check counter 16 (corresponding to a detection unit), and a B2 error information insertion unit 17 (corresponding to a first insertion unit). On the other hand, the transmission-side portion has a B2 error information detection unit 18, a B2 byte insertion unit 19 (corresponding to a setting unit), a parallel/serial conversion unit (P/S) 20, and a electricity/light conversion unit (OS) 21.

The OC-192 interface unit 12 on the transmission side has a frame converter 22 (corresponding to a multiplexing unit), a B2 byte insertion unit 23 (corresponding to a second insertion unit), a P/S 24, and an OS 25.

On the other hand, the OC-192 interface unit 13 on the reception side has an OR 26, an S/P 27, a B2 check counter 28 (corresponding to a first extraction unit), a B2 error information detection unit 30 (corresponding to a second extraction unit), a frame converter 32 (corresponding to a separation unit), and a B2 error information insertion unit 33. Four B2 error information detection units 30, four adders 31, and four B2 error information insertion units 33 are arranged for the GP1 to GP4, respectively.

<Operation of High-order Group Terminal Station Device>

Figure 5:
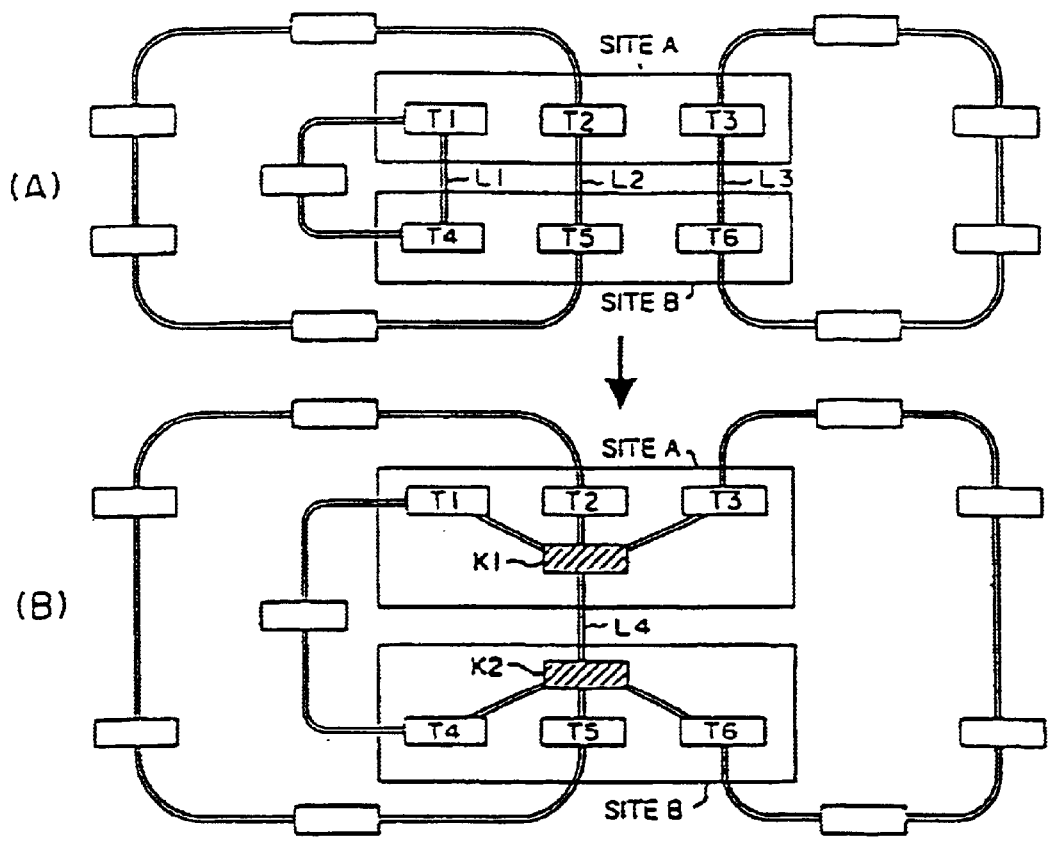
FIG. 5 is a diagram for explaining overlay of an optical communication network.
Figure 6:
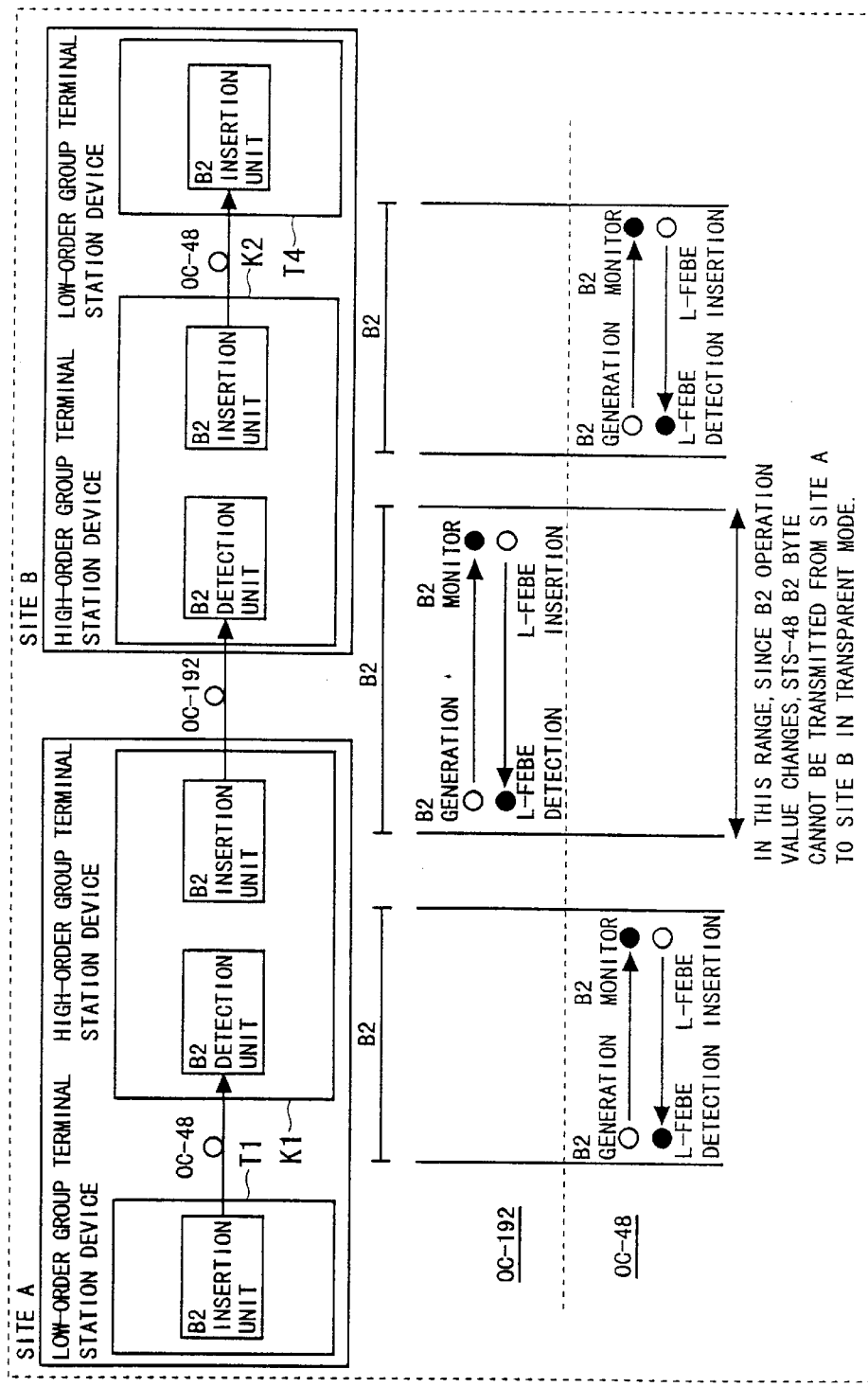
FIG. 6 is a diagram for explaining problems in a prior art.

An operation of the high-order group terminal station device KT1 shown in FIG. 2 will be described below. The high-order group terminal station device KT1 (KT2) shown in FIG. 2 is arranged in place of the high-order group terminal station devices K1 and K2 in the optical communication network shown in FIG. 5B. In this case, for example, an operation of each of the high-order group terminal station devices KT1 and KT2 (network system) used when data is transmitted from the low-order group terminal device T1 to the low-order group terminal device T4 will be described below.

As an example, it is assumed that a line for connecting the low-order group terminal device T1 and the low-order group terminal device T4 to each other is related to the GP1 in each of the high-order group terminal station devices KT1 and KT2, that a line for connecting the low-order group terminal device T2 and the low-order group terminal device T5 to each other is related to the GP2 in each of the high-order group terminal station devices KT1 and KT2, and that a line for connecting the low-order group terminal device T3 and the low-order group terminal device T6 to each other is related to the GP3 in each of the high-order group terminal station devices KT1 and KT2.

In FIG. 2, when data is transmitted from the low-order group terminal device T1 to the low-order group terminal device T4, the low-order group terminal device T1 transmits an STS-48 frame in which data is stored to the high-order group terminal station device KT1 through a low-speed line of OC-48.

When the STS-48 frame is received by the high-order group terminal station device KT1, the STS-48 frame is input to the OR 14 of the OC-48 interface unit 11a. The OR 14 converts the STS-48 frame from an optical signal to an electric signal to input the electric signal to the S/P 15. The S/P 15 converts the data form of the STS-48 frame from serial data to parallel data to input the parallel data to the B2 check counter 16.

The B2 check counter 16 detects the B2 byte of the STS-48 frame, and performs parity check of the detected B2 byte, so as to count parity errors of the B2 byte. Thereafter, the B2check counter 16 gives the final number of B2 parity errors and the STS-48 frame to the B2 error information insertion unit 17.

The B2 error information insertion unit 17 inserts the number of B2 parity errors into a space area of the overhead of the STS-48 frame. FIG. 3 is a chart for explaining the format of the STS-48 frame, and FIG. 4 is a chart for explaining a TC byte. As shown in FIG. 3, in the STS-48 frame used in the present invention, a storage area of a byte (to be referred to as a "TC byte") for "tandem connection (TC)" is set in a space area (e.g., #3) of the overhead. Note that the TC byte may be inserted into any space area of the overhead of the STS-48 frame.

The B2 error information insertion unit 17 inserts the number of B2 parity errors received from the B2 check counter 16 into the storage area of the TC byte. The TC byte, as shown in FIG. 4, indicates the number of B2 parity errors (the number of detected parity errors: 0 to 255 parity errors) by one byte.

When the B2 error information insertion unit 17 inserts the TC byte into the STS-48 frame, the B2 error information insertion unit 17 input the STS-48 frame to the frame converter 22 of the OC-192 interface unit 12.

Each of the OC-48 interface units 11b to 11d performs the same process as that performed in the OC-48 interface unit 11a for the STS-48 frame input to the corresponding interface, and inputs the STS-48 frame subjected to the process to the frame converter 22.

The frame converter 22 multiplexes the STS-48 frames input from the OC-48 interface units 11a to 11d (GP1 to GP4) to generate an STS-192 frame serving as a multi-frame, and inputs the STS-192 frame to the B2 byte insertion unit 19.

The B2 byte insertion unit 19 inserts a B2 byte of a predetermined value into the LOH of the STS-192 frame to input the B2 byte to the P/S 24. The P/S 24 converts the data form of the STS-192 frame from a parallel form to a serial form, and inputs the STS-192 frame having the serial form to the OS 25. The OS 25 converts the STS-192 frame from an electric signal to an optical signal, and transmits the STS-192 frame to a high-speed line of OC-192. In this manner, the STS-192 frame is transmitted to the high-order group terminal station device KT2.

When the STS-192 frame is received by the high-order group terminal station device KT2, the STS-192 frame is input to the OR 26 of the OC-192 interface unit 13. The OR 26 converts the STS-192 frame into an electric signal, and inputs the electric signal to the S/P 27. The S/P 27 converts the STS-192 frame into parallel data, and input the parallel data to the B2 check counter 28.

The B2 check counter 28 detects a B2 byte of the STS-192 frame, and performs parity check to the detected B2 byte, so as to count B2 parity errors. The B2 check counter 28 input a B2 error count value 29 (the number of B2 parity errors) of the B2 byte of the final STS-192. Thereafter, the B2 check counter 28 transmits the STS-192 frame to the frame converter 32.

The STS-192 frame transmitted toward the frame converter 32 is input to the B2 error information detection units 30 respectively arranged for the GP1 to GP4. Each B2 error information detection unit 30 detects a TC byte from an STS-48 frame corresponding to a group (GP) corresponding to the corresponding B2 error information detection unit 30 of the frames included in the input STS-192 frame, and inputs the TC byte to the adder 31 corresponding to the B2 error information detection unit 30.

For example, the B2 error information detection unit 30 corresponding to the GP1 extracts the TC byte (the number of B2 parity errors) of the STS-48 frame transmitted from the low-order group terminal device T1 and included in the input STS-192 frame.

Each adder 31 adds the B2 error count value 29 (the number of B2 parity errors) input from the B2 check counter 28 and the number of B2 parity errors input from the B2 error information detection unit 30 to each other, and inserts the addition result into the B2 error information insertion unit corresponding to the adder 31.

For example, the adder 31 corresponding to the GP1 adds the number of B2 parity errors of the STS-192 frame and the number of B2 parity errors of the STS-48 frame transmitted from the low-order group terminal device T1 to each other to input the addition result to the B2 error information insertion unit 33 corresponding to the GP1.

When the frame converter 32 receives the STS-192 frame from the B2 check counter 28, the frame converter 32 separates the STS-192 frame into four STS-48 frames to respectively input the STS-48 frames to the B2 error information insertion units 33.

For example, the frame converter 32 inputs the STS-48 frame transmitted from the low-order group terminal device T1 and obtained by separating the STS-192 frame to the B2 error information insertion unit 33 corresponding to the GP1.

Each B2 error information insertion unit 33 inserts the addition result (the number of B2 parity errors) input from the adder 31 into a space area of the overhead of the input STS-48 frame, and inputs the addition result to the OC-48 interface unit corresponding to the B2 error information insertion unit 33.

For example, the B2 error information insertion unit 33 corresponding to the GP1 inserts the addition result into a space area of the overhead of the input STS-48 frame, and inputs the addition result to the B2 error information detection unit 18 and the B2 byte insertion unit 19 of the OC-48 interface unit 11a.

In the subsequent operations, common operations are performed in the OC-48 interface units 11a to 11d. For this reason, the operation of the OC-48 interface unit 11a will be described as an example. The B2 error information detection unit 18 of the OC-48 interface unit 11a detects an addition result (the number of B2 parity errors) obtained by the adder 31 from the input STS-48 frame to input the addition result to the B2 byte insertion unit 19.

The B2 byte insertion unit 19 inserts a B2 byte into a storage area of a B2 byte of the input STS-48 frame. At this time, the B2 byte insertion unit 19 inserts a B2 byte having a value obtained such that the number of B2 parity errors input from the B2 error information detection unit 18 is included in an initial value (zero B2 parity error) of a predetermined B2byte into a B2 byte storage area.

More specifically, the B2 byte is considered as a value at which parity errors whose number is equal to the number of B2 parity errors obtained by the adder 31 when the parity check is performed for the B2 byte. In this manner, the B2 byte of the STS-48 frame includes the number of parity errors between the low-order group terminal device T1 and the high-order group terminal station device KT1 and the number of parity errors between the high-order group terminal station device KT1 and the high-order group terminal station device KT2.

Thereafter, the STS-48 frame is converted into serial data by the P/S 20, and the serial data is converted into an optical signal by the OS 21. The optical signal is transmitted to the low-order group terminal device T4 through the low-speed line of OC-48.

When the low-order group terminal device T4 receives an STS-48 frame transmitted from the high-order group terminal station device KT2, the B2 detection unit 10 (see FIG. 1) detects a B2 byte. At this time, the B2 byte includes the number of B2 parity errors included by the B2 byte insertion unit 19 of the OC-48 interface unit 11a and the number of B2 parity errors between the high-order group terminal station device KT2 and the low-order group terminal device T4, i.e., includes B2 parity errors between the low-order group terminal device T1 and the low-order group terminal device T4.

Thereafter, the calculation unit 11 (see FIG. 1) performs parity check for the B2 byte to calculate the number of B2 parity errors. Thereafter, the calculated number of B2 parity errors is notified to the high-order group terminal station device KT1 (L-FEBE: see FIG. 1). If the number of B2 parity errors exceeds a predetermined threshold value, the high-order group terminal station device KT2 performs a switching process of a line connecting the high-order group terminal station device KT2 and the low-order group terminal device T4 to each other.

According to the high-order group terminal station devices KT1 and KT2 of this embodiment, it is made possible that a B2 byte inserted by the low-order group terminal device T1 is received by the low-order group terminal device T4. More specifically, the high-order group terminal station device KT1 can transmit detection information related a B2 byte inserted by the low-order group terminal device T1 to the high-order group terminal station device KT2. Therefore, the low-order group terminal device T4 can obtain the number of B2 parity errors between the low-order group terminal device T1 and the low-order group terminal device T4.

In this manner, by overlay or the like, as show in FIG. 1, even if the high-order group terminal station devices KT1 and KT2 are inserted between the low-order group terminal device T1 and the low-order group terminal device T4, the low-order group terminal device T4 can properly monitor a code error between the low-order group terminal device T4 and the low-order group terminal device T1. For this reason, operation maintenance of the network between the low-order group terminal device T1 and the low-order group terminal device T4 can be properly performed.

In this embodiment, a configuration is designed such that the high-order group terminal station device KT1 transmits the number of B2 parity errors to the high-order group terminal station device KT2 as detection information. However, the following configuration may be used. That is, the high-order group terminal station device KT1 transmits a B2 byte itself to the high-order group terminal station device KT2 as detection information, and the number of B2 parity errors between the low-order group terminal device T1 and the high-order group terminal station device KT1 is calculated on the basis of the B2 byte transmitted from the high-order group terminal station device KT2.

What is claimed is:

1. A transmission terminal station apparatus in which a low-order group terminal device is connected through a line and a high-order group terminal station device is connected through a line comprising:

a detection unit which, when a frame including a payload in which data to be transmitted is stored and an overhead in which operation maintenance information of a network is stored is received from the low-order group terminal device, detects, as detection information, information related to the operation maintenance information to be transmitted from the overhead of the frame to the high-order group terminal station device;

a first insertion unit for inserting the detection information detected by the detection unit into a space area of the frame;

a multiplexing unit for generating a multi-frame including the frame; and a second insertion unit for inserting new operation maintenance information into an overhead of the multi-frame generated by the multiplexing unit to transmit the operation maintenance information toward the high-order group terminal station device.

2. A transmission terminal station apparatus according to claim 1, further comprising:

a first extraction unit which, when a multi-frame obtained by multiplexing a plurality of frames is received from the high-order group terminal station device, extracts operation maintenance information stored in an overhead of the multi-frame;

a second extraction unit for extracting detection information from each frame included in the multi-frame;

a separation unit for separating the multi-frame into a plurality of frames; and a setting unit for inserting new operation maintenance information generated by using information related to the operation maintenance information extracted by the first extraction unit and the detection information extracted by the second extraction unit into the overhead of each frame separated by the separation unit to transmit the operation maintenance information to the low-order group terminal device.

3. A transmission terminal station apparatus according to claim 1, wherein the operation maintenance information is code error monitoring information, and the detection unit detects information related to the code error monitoring information stored in the overhead of a frame received from the low-order group terminal device as the detection information.

4. A transmission terminal station apparatus according to claim 1, wherein the frame is an SDH frame or a SONET frame, the operation maintenance information is a B2 byte, and the detection unit detects, as the detection information, the number of errors calculated by using the B2 byte stored in the overhead of the frame received from the low-order group terminal device.

5. A transmission terminal station apparatus according to claim 1, wherein the first insertion unit inserts the detection information into a space area of the overhead of the frame.

6. A transmission terminal station apparatus in which a low-order group terminal device is connected through a line and a high-order group terminal station device is connected through a line comprising:

a first extraction unit which, when a multi-frame obtained by multiplexing a plurality of frames each having a payload in which data to be transmitted is stored and an overhead in which operation maintenance information of a network is stored is received from the high-order group terminal station device, extracts the operation maintenance information stored in the overhead of the multi-frame;

a second extraction unit for extracting detection information serving as information related to the operation maintenance information stored in the overhead of each frame when each frame included in the multi-frame is received by the high-order group terminal station device from each frame included in the multi-frame;

a separation unit for separating the multi-frame into a plurality of frames; and a setting unit for inserting new operation maintenance information generated by using information related to the operation maintenance information extracted by the first extraction unit and the detection information extracted by the second extraction unit into the overhead of each frame separated by the separation unit to transmit the operation maintenance information to the low-order group terminal device.

7. A transmission terminal station apparatus according to claim 6, wherein the operation maintenance information is code error monitoring information, the detection information is information related to code error monitoring information stored in the overhead of each frame when the high-order group terminal station device receives each frame included in the multi-frame, and the setting unit inserts new code error monitoring information generated by using information related to the code error monitoring information extracted by the first extraction unit and the detection information extracted by the second extraction unit into the overhead of each frame separated by the separation unit.

8. A transmission terminal station apparatus according to claim 6, wherein the frame is an SDH frame or a SONET frame, the operation maintenance information is a B2 byte, and the setting unit inserts a B2 byte having a value obtained by reflecting the number of errors of a B2 byte extracted by the first extraction unit and the number of errors of a B2 byte extracted as detection information by the second extraction unit on an initial value of a B2 byte to be inserted into the overhead of each of the frames separated by the separation unit into the overhead of the corresponding frame as new B2 byte.

9. A network system including a first high-order group terminal station device to which a first low-order group terminal device is connected through a line, and a second high-order group terminal station device to which the first high-order group terminal station device is connected through a line and to which a second low-order group terminal device is connected through a line, wherein the first high-order group terminal station device has:

a detection unit which, when a frame including a payload in which data to be transmitted is stored and an overhead in which operation maintenance information of a network is stored is received from the first low-order group terminal device, detects, as detection information, information related to the operation maintenance information to be transmitted from the overhead of the frame to the second high-order group terminal station device;

a first insertion unit for inserting the detection information detected by the detection unit into a space area of the frame;

a multiplexing unit for generating a multi-frame including the frame; and a second insertion unit for inserting new operation maintenance information into an overhead of the multi-frame generated by the multiplexing unit to transmit the operation maintenance information toward the second high-order group terminal station device, and the second high-order group terminal station device has:

a first extraction unit which, when the multi-frame is received from the first high-order group terminal station device, extracts the operation maintenance information stored in the overhead of the multi-frame;

a second extraction unit for extracting the detection information from each frame included in the multi-frame;

a separation unit for separating the frames included in the multi-frame; and a setting unit for inserting new operation maintenance information generated by using information related to the operation maintenance information extracted by the first extraction unit and the detection information extracted by the second extraction unit into the overhead of each frame separated by the separation unit to transmit the operation maintenance information to the second low-order group terminal device the separation unit.

10. A network system according to claim 9, wherein the operation maintenance information is code error monitoring information, the detection information is code error monitoring information of the frame received by the first high-order group terminal station device from the first low-order group terminal device, and the setting unit inserts new code error monitoring information generated by using information related to the code error monitoring information extracted by the first extraction unit and the detection information extracted by the second extraction unit into the overhead of each frame separated by the separation unit.

11. A network system according to claim 9, wherein the frame is an SDH frame or a SONET frame, the operation maintenance information is a B2 byte, and the setting unit inserts a B2 byte having a value obtained by reflecting the number of errors of a B2 byte extracted by the first extraction unit and the number of errors of a B2 byte extracted as detection information by the second extraction unit on an initial value of a B2 byte to be inserted into the overhead of each of the frames separated by the separation unit into the overhead of the corresponding frame as new B2 byte.

12. A network system according to claim 10, wherein the second low-order group terminal device has an information detection unit for detecting code error monitoring information from the overhead of the frame received from the second high-order group terminal station device, and a calculation unit for performing calculation related to code error monitoring between the first low-order group terminal device and the second low-order group terminal device by using the code error monitoring information detected by the information detection unit.

13. A network system according to claim 11, wherein the second low-order group terminal device has an information detection unit for detecting a B2 byte from the overhead of the frame received from the second high-order group terminal station device, and a calculation unit for calculating the number of errors of the B2 byte between the first low-order group terminal device and the second low-order group terminal device by using the B2 byte detected by the information detection unit.

14. An operation maintenance method for a transmission terminal station apparatus in which a low-order group terminal device is connected through a line and a high-order group terminal station device is connected through a line comprising:

the detection step which, when a frame including a payload in which data to be transmitted is stored and an overhead in which operation maintenance information of a network is stored is received from the low-order group terminal device, detects, as detection information, information related to the operation maintenance information to be transmitted from the overhead of the frame to the high-order group terminal station device;

the first insertion step of inserting the detection information detected in the detection step into a space area of the frame;

the multiplexing step of generating a multi-frame including the frame; and the second insertion step of inserting new operation maintenance information into an overhead of the multi-frame generated in the multiplexing step to transmit the operation maintenance information toward the high-order group terminal station device.

15. An operation maintenance method for a transmission terminal station apparatus according to claim 14, further comprising:

the first extraction step which, when a multi-frame obtained by multiplexing a plurality of frames is received from the high-order group terminal station device, extracts operation maintenance information stored in an overhead of the multi-frame;

the second extraction step of extracting detection information from each frame included in the multi-frame;

the separation step of separating the multi-frame into a plurality of frames; and the setting step of inserting new operation maintenance information generated by using information related to the operation maintenance information extracted in the first extraction step and the detection information extracted in the second extraction step into the overhead of each frame separated in the separation step to transmit the operation maintenance information to the low-order group terminal device.

16. An operation maintenance method for a transmission terminal station apparatus according to claim 14, wherein the operation maintenance information is code error monitoring information, and in the detection step, information related to the code error monitoring information stored in the overhead of a frame received from the low-order group terminal device is detected as the detection information.

17. An operation maintenance method for a transmission terminal station apparatus according to claim 14, wherein the frame is an SDH frame or a SONET frame, the operation maintenance information is a B2 byte, and in the detection step, the number of errors calculated by using the B2 byte stored in the overhead of the frame received from the low-order group terminal device is detected as the detection information.

18. An operation maintenance method for a transmission terminal station apparatus according to claim 14, wherein in the first insertion step, the detection information is inserted into a space area of the overhead of the frame.

19. An operation maintenance method for a transmission terminal station apparatus in which a low-order group terminal device is connected through a line and a high-order group terminal station device is connected through a line comprising:

the first extraction step which, when a multi-frame obtained by multiplexing a plurality of frames each having a payload in which data to be transmitted is stored and an overhead in which operation maintenance information of a network is stored is received from the high-order group terminal station device, extracts the operation maintenance information stored in the overhead of the multi-frame;

the second extraction step of extracting detection information serving as information related to the operation maintenance information stored in the overhead of each frame when each frame included in the multi-frame is received by the high-order group terminal station device from each frame included in the multi-frame;

the separation step of separating the multi-frame into a plurality of frames; and the setting step of inserting new operation maintenance information generated by using information related to the operation maintenance information extracted in the first extraction step and the detection information extracted in the second extraction step into the overhead of each frame separated in the separation step to transmit the operation maintenance information to the low-order group terminal device.

20. An operation maintenance method for a transmission terminal station apparatus according to claim 19, wherein the operation maintenance information is code error monitoring information, the detection information is information related to code error monitoring information stored in the overhead of each frame when the high-order group terminal station device receives each frame included in the multi-frame, and in the setting step, new code error monitoring information generated by using information related to the code error monitoring information extracted in the first extraction step and the detection information extracted in the second extraction step is inserted into the overhead of each frame separated in the separation unit.

21. An operation maintenance method for a transmission terminal station apparatus according to claim 19, wherein the frame is an SDH frame or a SONET frame, the operation maintenance information is a B2 byte, and in the setting step, a B2 byte having a value obtained by reflecting the number of errors of a B2 byte extracted in the first extraction step and the number of errors of a B2 byte extracted as detection information in the second extraction step on an initial value of a B2 byte to be inserted into the overhead of each of the frames separated in the separation step is inserted into the overhead of the corresponding frame as new B2 byte.

22. An operation maintenance method for a network system including a first high-order group terminal station device to which a first low-order group terminal device is connected through a line, and a second high-order group terminal station device to which the first high-order group terminal station device is connected through a line and to which a second low-order group terminal device is connected through a line, wherein the first high-order group terminal station device has the detection step which, when a frame including a payload in which data to be transmitted is stored and an overhead in which operation maintenance information of a network is stored is received from the first low-order group terminal device, detects, as detection information, information related to the operation maintenance information to be transmitted from the overhead of the frame to the second high-order group terminal station device, the first high-order group terminal station device has the first insertion step of inserting the detection information detected in the detection step into a space area of the frame, the first high-order group terminal station device has the multiplexing step of generating a multi-frame including the frame, the first high-order group terminal station device has the second insertion step of inserting new operation maintenance information into an overhead of the multi-frame generated in the multiplexing step to transmit the operation maintenance information toward the second high-order group terminal station device, and the second high-order group terminal station device has the first extraction step which, when the multi-frame is received from the first high-order group terminal station device, extracts the operation maintenance information stored in the overhead of the multi-frame, the second high-order group terminal station device has the second extraction step of extracting the detection information from each frame included in the multi-frame, the second high-order group terminal station device has the separation step of separating the frames included in the multi-frame, and the second high-order group terminal station device has the setting step of inserting new operation maintenance information generated by using information related to the operation maintenance information extracted in the first extraction step and the detection information extracted in the second extraction step into the overhead of each frame separated in the separation step to transmit the operation maintenance information to the second low-order group terminal device the separation unit.

23. An operation maintenance method for a network system according to claim 22, wherein the operation maintenance information is code error monitoring information, the detection information is code error monitoring information of the frame received by the first high-order group terminal station device from the first low-order group terminal device, and in the setting step, new code error monitoring information generated by using information related to the code error monitoring information extracted in the first extraction step and the detection information extracted in the second extraction step is inserted into the overhead of each frame separated in the separation step.

24. An operation maintenance method for a network system according to claim 22, wherein the frame is an SDH frame or a SONET frame, the operation maintenance information is a B2 byte, and in the setting step, a B2 byte having a value obtained by reflecting the number of errors of a B2 byte extracted in the first extraction step and the number of errors of a B2 byte extracted as detection information in the second extraction step on an initial value of a B2 byte to be inserted into the overhead of each of the frames separated in the separation step is inserted into the overhead of the corresponding frame as new B2 byte.

25. An operation maintenance method for a network system according to claim 23, wherein the second low-order group terminal device further has the information detection step of detecting code error monitoring information from the overhead of the frame received from the second high-order group terminal station device, and the second low-order group terminal device further has the calculation step of performing calculation related to code error monitoring between the first low-order group terminal device and the second low-order group terminal device by using the code error monitoring information detected in the information detection step.

26. An operation maintenance method for a network system according to claim 24, wherein the second low-order group terminal device further has the information detection step of detecting a B2 byte from the overhead of the frame received from the second high-order group terminal station device, and the second low-order group terminal device further has the calculation step of calculating the number of errors of the B2 byte between the first low-order group terminal device and the second low-order group terminal device by using the B2byte detected in the information detection step.

* * * * *